United States Patent [19]

Takano et al.

[11] 3,981,020
[45] Sept. 14, 1976

[54] INK DUST REMOVAL FOR INK JET SYSTEM PRINTER

[75] Inventors: Rikuo Takano, Musashino; Yuji Sumitomo, Nara; Toshio Kobayashi, Osaka; Yoichi Yamamoto; Tomoo Makita, both of Nara, all of Japan

[73] Assignees: Nippon Telegraph and Telephone Public Corporation, Tokyo; Sharp Kabushiki Kaisha, Osaka, both of Japan

[22] Filed: Sept. 26, 1974

[21] Appl. No.: 509,700

[30] Foreign Application Priority Data
Sept. 26, 1973 Japan............................ 48-108779
Sept. 27, 1973 Japan............................ 48-109040

[52] U.S. Cl..................................... 346/75; 101/1; 118/628; 346/140 R
[51] Int. Cl.²......................................... G01D 15/18
[58] Field of Search ............. 346/75, 140; 118/628, 118/638; 101/350, 426, 1

[56] References Cited
UNITED STATES PATENTS

| | | | |
|---|---|---|---|
| 1,941,001 | 12/1933 | Hansell | 346/75 X |
| 2,633,796 | 4/1953 | Pethick | 101/212 |
| 3,011,435 | 12/1961 | Jones et al. | 118/628 X |
| 3,854,399 | 12/1974 | Keur et al. | 346/75 X |

OTHER PUBLICATIONS

Cialone et al.; Ink "Fog" Collector etc.; IBM Tech. Disc. Bulletin, vol. 16, No. 3, Aug. 1973, pp. 785–786.

*Primary Examiner*—Joseph W. Hartary
*Attorney, Agent, or Firm*—Stewart and Kolasch, Ltd.

[57] ABSTRACT

In an ink jet system printer wherein ink droplets are emitted from a nozzle toward a recording paper, objectionable ink dust is formed and diffused in various directions after the ink droplets impinge upon the recording paper. When the diffused ink dust attaches to a unit such as deflection means, the system may operate erroneously. An electrode is arranged in a position suited for minimizing the deleterious effects of diffused ink dust from the ink jet system printer by the use of an electrostatic attraction force or an electrostatic repulsion force.

3 Claims, 4 Drawing Figures

INK DUST REMOVAL FOR INK JET SYSTEM PRINTER

BACKGROUND OF THE INVENTION

The present invention relates to an ink dust remover for use in an ink jet system printer.

In general, in ink jet system printers of types known in the art, charged ink droplets are emitted from a nozzle toward a recording paper. The charged ink droplets are then selectively deflected in response to signals corresponding to the information to be printed as the charged droplets pass through appropriate deflection means. The selectively deflected ink droplets are deposited on the recording paper in order to record desired symbols, as is known in the art. The ink droplets impinging upon the recording paper are travelling at very high speeds. Accordingly, upon impact small particles break off from the ink droplets and diffuse in various directions. These small particles which break off from the droplets are collectively referred to as ink dust. THe particles of ink dust bear the same charge as the droplet from which they originate. Accordingly, the ink dust bears a charge and tends to be attracted toward the deflection plates of the system deflection means, which are biased with opposite polarities from the dust. Hence, the ink dust becomes attached to the plates of the deflection means, which may cause the system to operate erroneously or break down, since the insulation of the unit can not be maintained.

SUMMARY OF THE INVENTION

Accordingly, an object of the present invention is to minimize the deleterious effects of ink dust in ink jet system printers.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Applicants have discovered that the above-mentioned ink dust has charges thereon of the same polarity as that of the charged ink droplets. To achieve the objects of the present invention by utilizing the above discovery, an electrode means is arranged in a position suited for substantially removing the diffused ink dust from the ink jet system printer with the use of a controlled electrostatic force. An electrode means is positioned at a predetermined distance away from the front surface of the recording paper and supplied with a voltage of the same polarity as that of the charged ink droplets or the ink dust. The diffusing ink dust is repelled toward the recording paper by an electrostatic repulsion force developed by the electrode means. Therefore, the diffusing ink dust is directed away from the deflection means by the electrostatic force developed by the electrode means. Thus the ink dust does not attach or collect in the deflection unit of the printer system.

BRIEF DESCRIPTION OF THE DRAWINGS

The present invention will become more fully understood from the detailed description given hereinbelow and the accompanying drawings which are given by way of illustration only, and thus are not limitative of the present inventon and wherein.

DETAILED DESCRIPTION OF THE PREFERRED EMBODIMENTS

Figure 1:
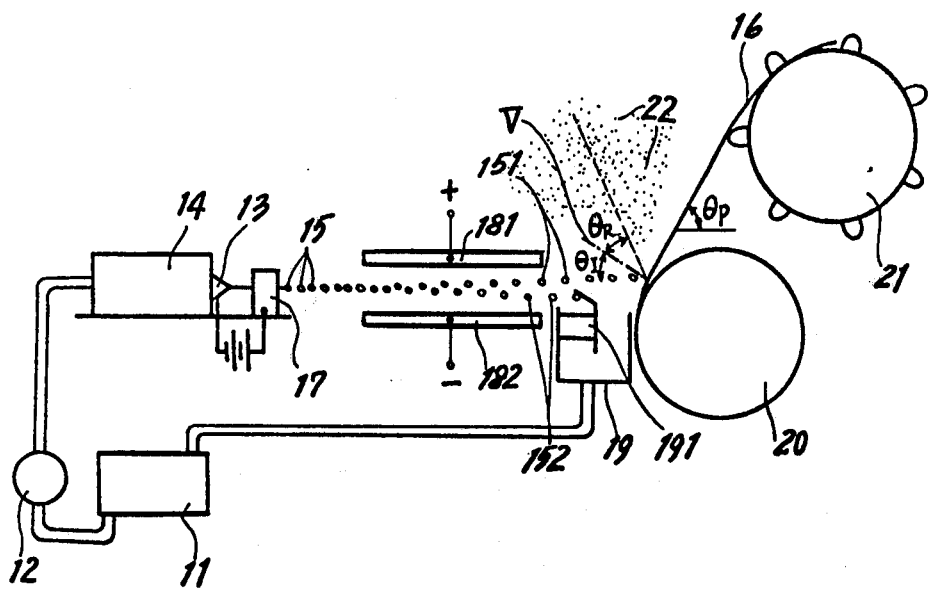
FIG. 1 is a schematic diagram for the purpose of explaining a principle of an ink jet system printer of the charge amplitude controlling type known in the prior art.

Referring now to the drawings, and to facilitate an understanding of the present invention, the principles of operation of an ink jet system printer of the charge amplitude controlling type known in the prior art will be first described with reference to FIG. 1. Ink liquid contained within an ink reservoir 11 is sent under pressure to a nozzle 13 through a pump 12. The nozzle 13 is held by an ink droplet issuance unit including an electromechanical transducer 14 such as a piezo-vibrator. The ink liquid issuing from the nozzle 13 is excited by electromechanical transducer 14 so that ink droplets 15 of a uniform mass and of a frequency equal to the exciting signal frequency are formed. The ink droplets 15 spaced from each other by a constant distance are directed toward a recording paper 16. A tip of the nozzle 13, which issues the ink liquid, is usually constituted by a capillary tube of 60 – 80 $\mu$m in diameter, and the ink liquid in the ink supply system is circulated under a pressure of 3 – 5 kg/cm$^2$. Therefore, the ink droplets 15 from the nozzle 13 are omitted at a velocity of about 20 m/sec. The individual ink droplets 15 are charged in response to printing information to selected amplitudes with the use of a charging electrode 17 in a known manner, and are deflected in accordance with the amplitude of charges on the droplets as they pass over a high-voltage electric field established by a pair of high-voltage deflection plates 181, 182. The droplets are then deposited on the recording paper 16 in order to record a desired symbol. Ink droplets 152, not contributive to writing operation, travel in a rectilinear direction or are deflected in the opposite direction to droplets 151. Hence, droplets 152 are not deposited on the recording paper 16. The ink droplets 152 are directed to a barrier 191 of a beam gutter 19 in order to recirculate waste ink liquid to the ink reservoir 11. A paper feed roll 20 and a sprocket wheel 21 are provided for running the recording paper in an intermittent mode for a line feed, etc.

Since the ink droplets 15 are emitted from the nozzle 13 at a velocity of 20 m/sec, after the ink droplets 15 impinge upon the recording paper 16 or the beam gutter 19, a part of the ink droplet 15 is broken into ink dust 22 which are diffused in various directions. To reduce the occurrence of the ink dust 22, the barrier 191 of the beam gutter 19 is inclined at preferred angle in a manner which tends to weaken the elastic collision, as shown in FIG. 1. There is also an attempt to incline the recording paper 16 at a predetermined angle relative to the vertical for the purpose of minimizing the occurrence of the ink dust, but it is impossible to perfectly eliminate the ink dust 22 since printing distortion will increase as the inclination angle of the recording paper increases.

In the case where recording paper 16 is inclined at an angle $\theta_p$ with respect to the horizontal, ink droplets 151 contributive to the writing operation impinge upon the recording paper 16 at an angle $\theta_I$ with respect to the perpendicular $\triangledown$ of the recording paper 16. The ink dust 22, which is formed after the ink droplets 151 impinge upon the recording paper 16, disperse in accordance with a Gaussian distribution. The distribution center is positioned at an angle $\theta_R$ with respect to the perpendicular $\triangledown$ of the recording paper 16 in a manner to satisfy the formula $\theta_I = \theta_R$. The distributed ink dust 22 is attracted to the deflection electrode 181, since the ink dust 22 has charges thereon of the same polarity as that of the ink droplets 151, negative polarity in the drawing, and the deflection electrode 181 is supplied with the voltage of the opposite polarity. Accordingly, the ink dust 22 attracted to the deflection electrode 181 is collected on the deflection electrode 181 in the course of the writing operation over several hours and causes the ink jet system printer to break down or operate erroneously, since the insulation of the deflection electrode 181 can not be maintained.

Figure 2:
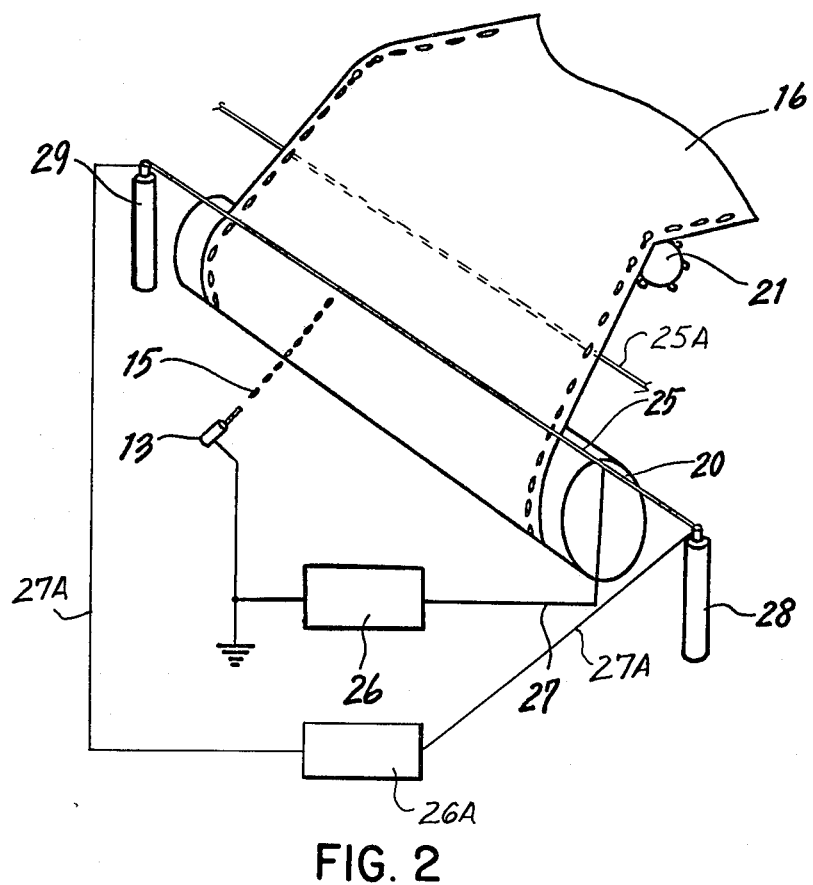
FIG. 2 is a perspective view showing an embodiment of the present invention.

Referring now to FIG. 2, there is illustrated an embodiment of the present invention, wherein the ink droplets 15 are emitted from the nozzle 13 and deflected in accordance with the printing informaton with the use of the charging means and the deflection means (not shown) such as those illustrated in FIG. 1. The deflected droplets are deposited on recording paper 16 in order to record a desired symbol. There is provided a wire 25, preferably a piano wire or a stainless steel wire, etc., in front of the recording paper 16. The wire is so disposed that it does not disturb the observation of the printed symbol. The wire 25 is connected with a D.C. power source 26 through wire 27. The other terminal of the D.C. power source 26 is connected with ground potential. The wire 25 is supported by a pair of insulators 28 and 29. Thus, wire 25 is biased to the potential of D.C. power source 26 creating an electrostatic field around the wire.

In the case where the ink dust has charges of negative polarity thereon and the wire 25 is supplied with a voltage of the positive polarity, the ink dust is attracted to the wire 25 by an electrostatic attraction force. On the contrary when the ink dust is charged with negative polarity and the wire 25 is supplied with a voltage of negative polarity, the ink dust is repelled toward the recording paper 16 by an electrostatic repulsion force. Although the repelled ink dust becomes attached to the recording paper 16, it may be negligible from a visual point since the repelled ink dust is so small in size and is substantially uniformly distributed on the recording paper 16.

When the wire 25 is supplied with the voltage of the opposite polarity to that of the charges carried on the ink dust in order to attract the ink dust to the wire 25, another power source 26A may be provided and connected with the both ends of the wire 25 by wires 27A at insulators 28 and 29 to produce an electric current for heating the wire 25, thereby evaporating the attracted ink dust.

In the alternative a wire 25A may be arranged at the back of the recording paper 16. When the wire 25A is positioned adjacent to the back of the recording paper and supplied with voltage from voltage source 26 of opposite polarity to that of the charge carried on the ink dust, the diffusing ink dust is attracted toward the recording paper by an electrostatic attraction force generated by wire 25A.

In all of the embodiments of FIG. 2 the ink dust diffused from recording paper 16 is directed away or diverted from the electrostatic deflection means such as 181, 182 of FIG. 1. Thus, the deleterious effects of ink dust on the ink jet system printer is minimized.

The strength of the electrostatic field created by wires 25 or 25A is chosen so that it is not of sufficient magnitude to have an appreciable effect on the travel of ink droplets which are to be deposited on recording paper 16. Because of the high velocity of the droplets and the large mass thereof in comparison to the mass of ink dust particles, an electrostatic field strength may be chosen which will attract or repel ink dust but will have a negligible effect on ink droplets.

Figure 3:
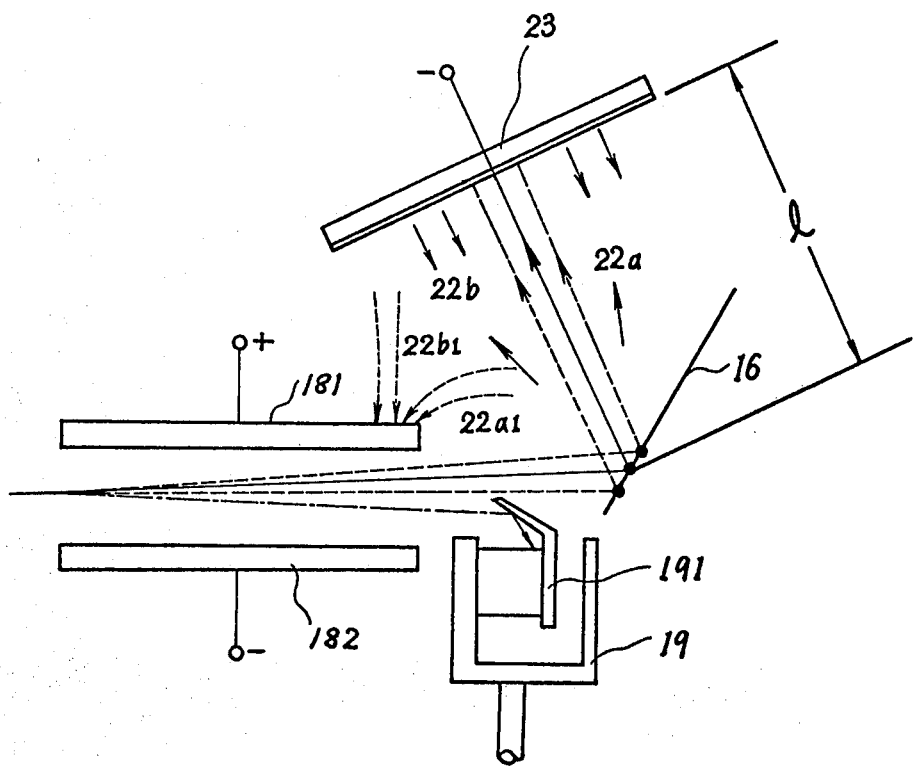
FIG. 3 is a diagrammatic view showing another embodiment of the present invention.

Referring now to FIG. 3, showing another embodiment of the invention, wherein like elements corresponding to those of FIG. 1 are indicated by like numerals.

Ink dust 22a is formed after the ink droplets impinge upon the recording paper 16 and are diffused in various directions in a Gaussian distribution, the distribution center being at an angle $\theta_R$ with respect to the perpendicular of the recording paper 16. There is provided a plane electrode 23 having an area sufficient to repel the diffusing ink dust toward the recording paper 16 in the direction of the distribution center. A voltage of the same polarity as that of the charges carried on the ink droplets 151 is applied to the plane electrode 23. The reference numbers 22a and 22b represent directions of movement of the diffused ink dust and the repelled ink dust, respectively. It is a matter of importance to take into consideration the relation of distance $l$ between the recording paper 16 and the plane electrode 23 and the voltage value applied to the plane electrode 23. The repulsion force created by the plane electrode 23 must be great enough to repel the diffused ink dust 22a at a considerably high velocity. When the distance $l$ is long, although the applied voltage to the plane electrode 23 can be made lower, a part of the ink dust 22a may become attached to the deflection electrode 181 which is opposite in polarity to that of the charges carried on ink dust 22a. When the distance $l$ is short, the applied voltage to the plane electrode 23 must be considerably high in order to prevent the ink dust from attaching to the electrode 23. This will cause some troubles in the insulating technology. For example, when the plane electrode 23 is connected with the power source for the deflection electrode 182, $-3KV$ is applied to the plane electrode 23, and the plane electrode 23 is spaced away from the printing center on the recording paper 23 about 30 mm., some of the ink dust 22a becomes attached to the plane electrode 23 but the deflection electrode 181 is almost kept clean.

As shown in FIG. 3, when the plane electrode 23 is arranged in front of the recording paper 16, some of the diffusing ink dust 22al and some of the repelled ink dust 22bl is unavoidably attached to the deflection electrode 181. However, the amount of dust attached to electrode 181 is negligible and minimized by electrode 23 and the potential thereon.

Figure 4:
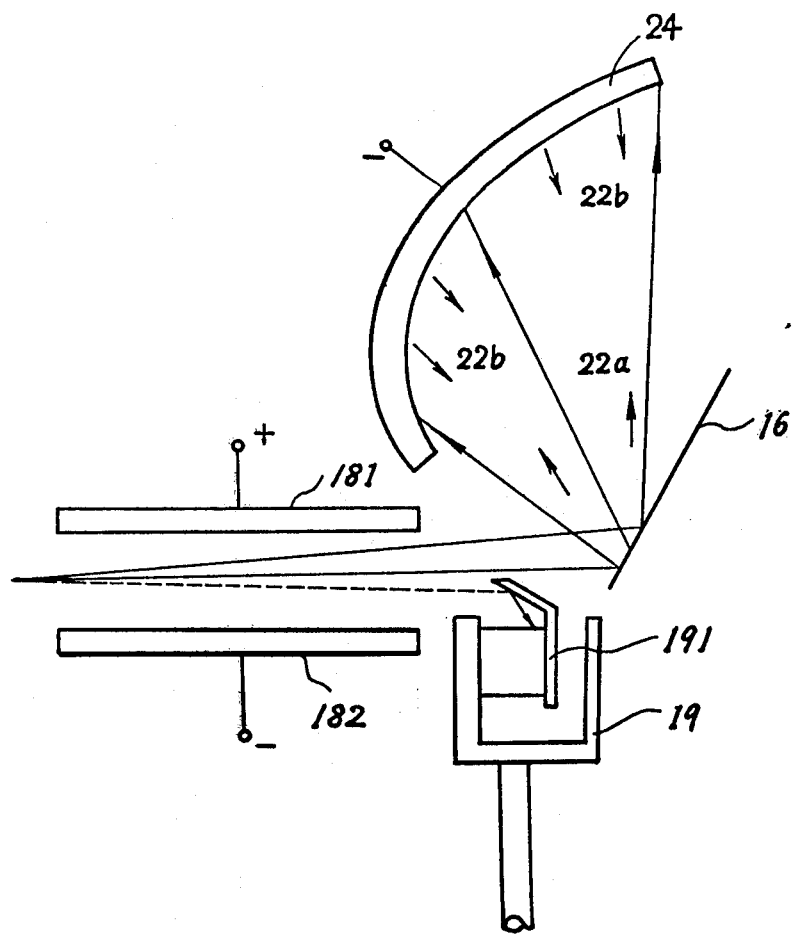
FIG. 4 is a diagrammatic view showing still another embodiment of the present invention.

Referring now to FIG. 4, showing still another embodiment of the invention which overcomes the above-mentioned defect, wherein like elements corresponding to those of FIG. 3 are indicated by like numerals.

There is provided in front of the recording paper 16 a curved electrode 24, which is curved inward, the center of the curve being positioned at the dust distribution center, in a manner to repel substantially all of the diffused ink dust toward the recording paper 16. A voltage sufficient to repel the ink dust toward the recording paper 16 is applied to the curved electrode 24. With the construction of FIG. 4 virtually none of the ink dust 22a, 22al and 22bl becomes attached to the curved electrode 24 nor the deflection electrode 181.

When it is required to observe the printing condition, the plane electrode 23 of FIG. 3 or the curved electrode 24 of FIG. 4 may comprise a transparent electrode such as NESA glass (trade mark) or transparent plastics coated by a transparent conductor.

Although the present invention was descried with reference to the embodiments relating to an ink jet system printer of the charge amplitude controlling type, the present invention may also be applied to an ink jet system printer of the deflection voltage controlling type.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In combination with an ink jet system printer which emits charged ink droplets from a nozzle toward a recording paper and selectively deflects said ink droplets by deflection means and records desired symbols on said recording paper with said selectively deflected ink droplets, an ink dust remover comprising:
    electrode means for generating an electrostatic field for directing ink dust diffused from said recording paper away from said deflection means, whereby the deleterious effects of ink dust on the ink jet system printer are minimized;
    first voltage generating means for applying an electric potential to said electrode means of an opposite polarity to the charges carried by said ink droplets; and
    second voltage generating means coupled to said electrode means for passing electric current therethrough, said current being of a sufficient magnitude to cause evaporation of ink dust collected on said electrode means.

2. In combination with an ink jet system printer which emits charged ink droplets from a nozzle along a predetermined path toward a recording paper and selectively deflects said ink droplets by deflection means and records desired symbols on said recording paper with said selectively deflected ink droplets, said recording paper being disposed at a predetermined angle with respect to said predetermined path, ink dust being created by the impact of said ink droplets on the said recording paper, said ink dust being reflected from said paper in a Gaussian distribution having a central axis directed away from said deflector means, an ink dust remover comprising:
    electrode means and voltage generating means for applying an electrical potential to said electrode means to create an electrostatic field, said electrode means extending across said recording paper and being so disposed with respect thereto that the lines of force of said electrostatic field are directed substantially along said central axis, whereby the deleterious effects of ink dust on the ink jet system printer are minimized, said electrode means including wire means adjacent said recording paper electrically connected to said voltage generating means, the electric potential applied to said wire means being opposite in polarity to the charges carried by said ink droplets, said wire means being positioned between said recording paper and said deflection means;
    insulator means for supporting the ends of said wire means; and
    a second voltage generating means coupled to both ends of said wire means for producing an electric current through said wire means, said current being of a sufficient magnitude to cause the evaporation of ink dust collected on said wire means.

3. The combination of claim 2 wherein the electric potential applied to said wire means is of the same polarity as the charges carried by said ink droplets and said wire means is positioned between said recording paper and said deflection means.

* * * * *